United States Patent [19]

Shioya

[11] Patent Number: 4,469,721

[45] Date of Patent: Sep. 4, 1984

[54] HIGH EMISSIVITY REFRACTORY COATING, PROCESS FOR MANUFACTURING THE SAME, AND COATING COMPOSITION THEREFOR

[76] Inventor: Kiyohiko Shioya, No. 19-7, Azabujuban 2-chome, Minato-ku, Tokyo, Japan

[21] Appl. No.: 501,360

[22] Filed: Jun. 6, 1983

[51] Int. Cl.$^3$ ............................................. C09D 1/02
[52] U.S. Cl. .................................. 427/397.8; 106/84; 501/89; 501/97
[58] Field of Search .................... 106/84; 501/89, 97; 427/397.8, 397.7

[56] References Cited

U.S. PATENT DOCUMENTS

| | | | |
|---|---|---|---|
| 2,806,005 | 9/1957 | White | 501/89 X |
| 3,615,782 | 10/1971 | Bawa et al. | 106/84 |
| 3,892,584 | 7/1975 | Takeda et al. | 501/89 |

FOREIGN PATENT DOCUMENTS

| | | | |
|---|---|---|---|
| 15927 | 2/1980 | Japan | 501/89 |
| 23024 | 2/1980 | Japan | 501/89 |

*Primary Examiner*—G. L. Kaplan
*Attorney, Agent, or Firm*—Sughrue, Mion, Zinn, Macpeak, and Seas

[57] ABSTRACT

A high emissivity refractory coating comprising a cured coating composition comprised of a powder mixture containing 17 to 22% by weight of silicon carbide, 6 to 11% by weight of graphite, 17 to 22% by weight of aluminum oxide, 2 to 5% by weight of silicon nitride, 8 to 12% by weight of tricobalt tetroxide, 18 to 22% by weight of cobalt aluminum oxide and 18 to 23% by weight of ferrosilicon, and an aqueous solution of potassium silicate. The high emissivity refractory coating is applied onto the surface of furnace refractories or ceramic fibers. The coating does not peel from the surface of the furnace wall and increases the energy efficiency of the furnace.

9 Claims, 4 Drawing Figures

Sample A        Sample B

Sample A        Sample B

The surface of bricks from which the coatings formed were removed

Temp ... 1100 °C ≈ 1200 °C

The deterioration of the S.C. coating was observed.

HIGH EMISSIVITY REFRACTORY COATING, PROCESS FOR MANUFACTURING THE SAME, AND COATING COMPOSITION THEREFOR

FIELD OF THE INVENTION

This invention relates to a high emissivity refractory coating making it possible to make highly efficient use of heat energy in industrial furnaces or other heating apparatus, a process for manufacturing the high emissivity refractory coating, and a coating composition therefor.

BACKGROUND OF THE INVENTION

There is known a one-component coating composition prepared by using a mixture of silicon carbide and a phosphate as a binder. This composition may be applied to, for example, the wall of an industrial furnace to improve its thermal efficiency. However, the refractory coating formed by this composition has a number of disadvantages. At a high temperature of, say, 1,000° C. or above, it is not only likely to peel off the furnace wall, but also tends to cause the surface layers of bricks to peel off the wall. Even in a medium temperature range, chemical reactions and thermal stress develop both at the contact surface and within the refractory material soaked with the binder, depending on the refractory material. They cause structural spalling and embrittlement, resulting in the cracking and peeling of the coating. Especially in the case of highly porous refractories having a low coefficient of elasticity, their low compressive strength tends to cause the disintegration of the refractories due to the concentration of stress in the area between the portion of which the thermal and physical properties have been changed as a result of the contact or impregnation of foreign material, and the remaining portion.

SUMMARY OF THE INVENTION

An object of this invention is to provide a refractory coating having a high black body emissivity which adheres closely to a refractory furnace wall to form a refractory and mechanical strong blackened base thereon, and which does not peel for a long time.

Another object of this invention is to provide a process for manufacturing the high emissivity refractory coating having the above-described properties.

A further object of this invention is to provide a coating composition useful for the manufacture of the above-described high emissivity refractory coating.

According to this invention there are provided a high emissivity refractory coating comprising a cured coating composition comprised of a powder mixture containing 17 to 22% by weight of silicon carbide, 6 to 11% by weight of graphite, 17 to 22% by weight of aluminum oxide, 2 to 5% by weight of silicon nitride, 8 to 12% by weight of tricobalt tetroxide, 18 to 22% by weight of cobalt aluminum oxide and 18 to 23% by weight of ferrosilicon, based on the total weight of the powder mixture, and an aqueous solution of potassium silicate, a process for manufacturing a high emissivity refractory coating which comprises mixing the powder mixture with the aqueous potassium silicate solution to prepare a suspension, applying this suspension to the surface of furnace refractories or ceramic fibers, and drying it for curing, and a coating composition useful for the manufacture of the high emissivity refractory coating.

DETAILED DESCRIPTION OF THE INVENTION

Figure 1:
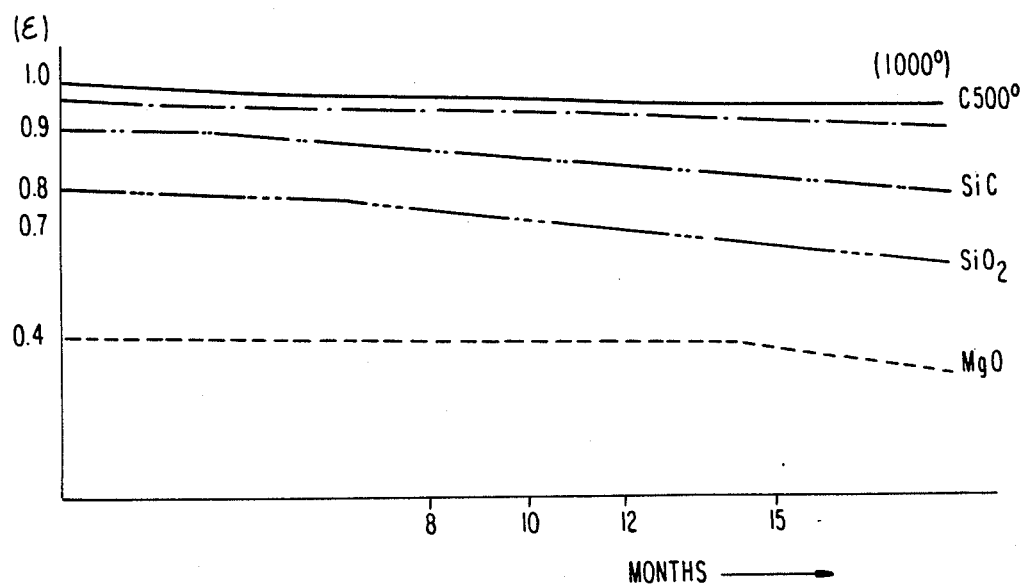
FIG. 1 is a graph showing changes in the emissivity ($\epsilon$) of refractory coatings with the lapse of time.
Figure 2:
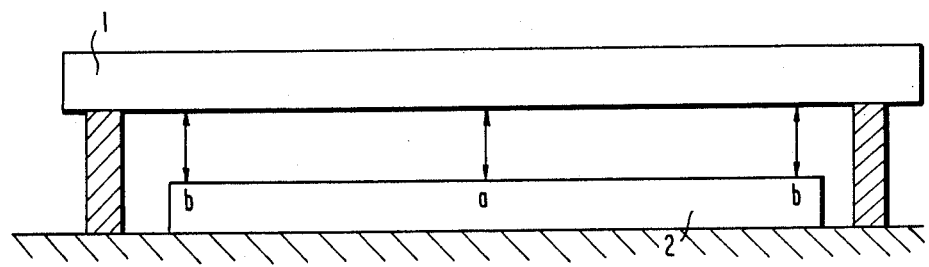
FIG. 2 illustrates an arrangement used for examining the deformation of coatings in Example 3.

This invention employs preferably silicon carbide having a purity of at least 85%. The silicon carbide has preferably a particle size of 280 mesh or more, more preferably 300 to 340 mesh, most preferably 320 mesh. The silicon carbide is generally present in an amount of 17 to 22% based on the total weight of the powder mixture. It forms a covalent bond with graphite, and provides a coating with thermal shock, strain aging and corrosion resistances as well as high thermal emissivity. Graphite has preferably a fixed carbon content of at least 94%, more preferably 97% or more, and a particle size of 280 mesh or more, more preferably 280 to 350 mesh, most preferably 300 mesh, and forms a covalent bond with silicon carbide to impart high thermal emissivity, a high melting point and a high degree of hardness to the coating. The graphite is generally present in an amount of 6 to 11% based on the total weight of the powder mixture. Aluminum oxide has preferably a purity of at least 79% and a particle size of 280 mesh or more, more preferably 280 to 350 mesh, most preferably 300 mesh, and may contain $Fe_2O_3$, $SiO_2$ and MgO. It gives the coating a high degree of hardness and heat resistance, and activates the reaction of the coating components. The aluminum oxide is generally present in an amount of 17 to 22% based on the total weight of the powder mixture. Silicon nitride helps the coated film maintain its sintered strength, and forms a barrier oxide film which protects the interior of the coating. Silicon nitride has preferably a silicon content of 50 to 70%, more preferably 55 to 60%, and a particle size of 280 mesh or more, more preferably 280 to 350 mesh, most preferably about 325 mesh, and contains other elements such as N, Fe and Al. It imparts wear, spalling and corrosion resistances to the coating. The silicon nitride is generally present in an amount of 2 to 5% based on the total weight of the powder mixture. Tricobalt tetroxide, $Co_3O_4$, has preferably a molecular weight of 240, the following analytical purity and a particle size of 200 mesh or more, more preferably 200 to 300 mesh, most preferably 200 mesh. In the analytical purity of $Co_3O_4$, the tricobalt tetroxide having a spinel structure $Co^{II}Co_2^{III}O_4$ ($\alpha$-crystal, lattice constant of a=8 Å and melting point of 1,950° C.) and a purity of at least 95% is more preferred. It serves as a catalyst for activating the coating components, and cooperates with the carbide in reinforcing the adhesion of the coating to the refractories. The tricobalt tetroxide is generally present in an amount of 8 to 12% based on the total weight of the powder mixture.

Cobalt aluminum oxide (Al-Co) has preferably an aluminum content of about 40 to 60%, more preferably 50 to 60%, and a particle size of 200 mesh or more, more preferably 200 to 300 mesh, and serves as a catalyst like tricobalt tetroxide. In order to form a stable and strong bond between the coating and the refractories, it is important to employ an appropriate combination of cobalt aluminum oxide and tricobalt tetroxide. The cobalt aluminum oxide is generally present in an amount of 18 to 22% based on the total weight of the powder mixture. If only one of them is used, or if their proportions are not suitable, it is impossible to obtain the advantages of this invention.

Ferrosilicon has preferably a silicon content of at least 75%, more preferably 89% or more, and a particle size of 200 mesh or more, more preferably 200 to 300 mesh, and forms a compound, such as $SiO_2$ or $Si_3N_4$, at a high temperature. It is inert and excellent in heat resistance and creep strength. Further, the ferrosilicon is polymerized by the reaction with aluminum oxide and cobalt oxide in improving the stability and activity of the catalyst and the strength of the coating at a high temperature. The ferrosilicon is generally present in an amount of 18 to 23% based on the total weight of the powder mixture.

These components are each finely pulverized by an ultrafine pulverizer to their respective particle sizes as hereinabove mentioned, and mixed in predetermined proportions to form a powder mixture.

An aqueous solution of potassium silicate ($K_2O_n \cdot SiO_2$), preferably n=3 or 4, is prepared by adding 55 to 65 part by weight of water to 50 to 60 part by weight of potassium silicate. A mixture thereof with the powder mixture forms a semi-molten transitional crystal when it is baked, and a solid solution forms a strong bond with the refractories.

The powder mixture and the aqueous potassium silicate solution having a weight ratio of 1:1 to 1:1.5 are mixed and stirred in an appropriate container to form a uniform suspension. The suspension is applied to the surface of the refractories uniformly by spraying or by any other appropriate method. The amount of the suspension applied varies depending upon the conditions in furnaces used. In general, the preferred amount of the suspension coated is about 400 to 3,000 g/m². The coating thus applied is cured if it is allowed to dry for about 3 hours, but it is better to sinter it by baking it at a temperature of 200° C. to 600° C. for about 6 hours.

The high emissivity refractory coating obtained by the process of this invention is inert and has a close structure. It is thermally and chemically stable. It does not undergo any change at a high temperature, and is highly resistant to any corrosive substance. It has a far better adhesive strength to the furnace refractories than any similar coating known in the art. The adhesive strength refers to a limiting strength of coating base in the case of adding a certain load on the base at various temperatures. It has a high degree of volumetric stability at an elevated temperature (e.g., about 1,800° C.) and a high level of thermal emissivity. It drastically improves the transfer of heat in the furnace and increases its effective heat to thereby enable furnace operation with a high efficiency of energy utilization. The thermal emissivity is measured by optical pyrometer at a wavelength of transmitted light of about 0.65 μm. The process of this invention is applicable to regularly shaped bricks, castable refractories and ceramic fibers which form, for example, roof arches for heating furnaces, furnace walls, hearths, columns in combustion chambers, and the inner walls of various types of industrial furnaces used in the petroleum, petrochemical and steel industries.

The coating produced by the process of this invention maintains a high level of emissivity ($\epsilon$) for a longer period of time than any conventionally available coating. For example, it maintains an emissivity value ($\epsilon$) of 0.9 to 0.95 at a temperature of 1,000° C. for 15 months, as opposed to conventional materials, such as chamotte refractories, as shown in FIG. 1. The refractory coating according to this invention forms an ideal black body having substantially deep-black color.

The invention will now be described more specifically with reference to the following examples. However, the scope of the invention is not limited to these examples.

EXAMPLE 1

The following materials were thoroughly mixed together in a mixer having a stirrer to prepare 57.5 kg of a powder mixture:

| Material | Weight (%) | Particle Size (mesh) |
| --- | --- | --- |
| Silicon carbide (purity of 85%) | 20 | 320 |
| Graphite (C content of 97%) | 7 | 300 |
| Aluminum oxide (purity of 79%) | 20 | 300 |
| Silicon nitride (Si content of 55%) | 3 | 325 |
| Tricobalt tetroxide (purity of 95%) | 10 | 200 |
| Al—Co (Al content of 50%) | 20 | 200 |
| Ferrosilicon (Si content of 89%) | 20 | 200 |

An aqueous solution of potassium silicate in the quantity of 75 kg was prepared by dissolving 30 kg of potassium silicate in 45 kg of water. The powder mixture was added into the solution, and stirred thoroughly to prepare a uniform suspension. The suspension was applied in an amount of 500 g/m² by a spray gun to the roof and sidewalls of a 30 t/h capacity walking beam type continuous heating furnace constructed of SK38 fire bricks containing ceramic fibers. The furnace was fired with C heavy oil, and operated at a temperature of 1,100° C. to 1,350° C. for 8 months continuously. The deformation of the coating surface stricken with a soft iron ball having weight of 1.5 kg from the distance of 100 cm was observed, and the surface blackness was measured by optical pyrometer ($\lambda = 0.65\mu$). The coating maintained a strong bond with the bricks, and blackened surface ($\epsilon = 0.94$). It was excellent in brightness and density. Neither any oxide layer nor any gas attack was found. The results can be summarized as follows:

1. Furnace: Walking beam type continuous heating furnace
2. Capacity and fuel: 30 t/h; C heavy oil
3. Test item: Fuel consumption (liters/ton) over the period of 6 months
4. Furnace temperature: 1,350° C.; preheating zone, 1,100° C., 1,230° C.
5. Refractories: SK38 fire bricks and ceramic fibers
6. Material annealed: Metallic rolls
7. Coated area: 235 m²
8. Fuel consumption:
    (a) Before coating: 51 liters/ton;
    (b) After coating: 44 liters/ton, which means a reduction of 13%
9. Period of operation: Mar. 1981 to Oct. 31, 1981
10. Average monthly fuel consumption:
    51 liters/ton ×14,000 ton=714,000 liters
11. Average monthly operating cost:

14,000 tons (production)×7 liters (fuel saving per ton; 51 liters−44 liters) × ¥ 67 (price of oil) = ¥ 6,566,000

12. Average energy (fuel) saving: 13%

EXAMPLE 2

The following materials were thoroughly mixed with a ball mill having a stirrer to prepare 12 kg of a powder mixture:

| Material | Weight (%) | Particle Size (mesh) |
|---|---|---|
| Silicon carbide (purity of 85%) | 18 | 324 |
| Graphite (C content of 97%) | 10 | 300 |
| Aluminum oxide (purity of 79%) | 20 | 300 |
| Silicon nitride (Si content of 55%) | 4 | 325 |
| Tricobalt tetroxide (purity of 95%) | 8 | 200 |
| Al—Co (Al content of 50%) | 22 | 220 |
| Ferrosilicon (Si content of 89%) | 18 | 200 |

An aqueous solution of potassium silicate in the quantity of 14.5 kg was prepared by dissolving 7 kg of potassium silicate in 7.5 kg of water. The fine powder mixture was dispersed in the solution to prepare a uniform suspension. The suspension was applied in an amount of 500 g/m² by a spray gun onto the whole inner wall surfaces of an electric furnace of the type described below. The coating was left to dry for about 3 hours, and dried by heating at a temperature which was raised gradually from 150° C., and maintained at 520° C. for about 4 hours. The results can be summarized as follows:

1. Furnace: #13 Batch type electric furnace
2. Capacity and source of heat: 3,290 kg/month; electricity
3. Test item: Power consumption (kg/kWh) over the period of 6 months
4. Furnace temperature: 520° C.
5. Material annealed: Aluminum plates
6. Coated area: 50 m²
7. Energy consumption:
   (a) Before coating: 3,789,511 Kcal (average per batch);
   (b) After coating: 2,900,519 Kcal (average per batch), which means a reduction of 20% on the average
8. Frequency of operation: 10 batches per month on the average
9. Power consumption: 13,140 kW per month on the average
10. Power saving: 34,078 kWh−26,240 kWh=7,838 kWh

EXAMPLE 3

The process of this invention was employed to form a coating on a ceramic fiber base.

1. Test Method
   (1) Material to be coated: Two KAOWOOL 1400 boards (products of ISOLITE INDUSTRIAL CO., LTD., Japan) each measuring 600 mm by 400 mm by 20 mm
   (2) Coating material: High emissivity refractory coating of this invention prepared by dissolving 300 g of a powder mixture in 450 cc of a solvent. The powder mixture contained 22% of silicon carbide, 7% of graphite, 20% of aluminum oxide, 2% of silicon nitride, 8% of tricobalt tetroxide, 18% of cobalt aluminum oxide and 23% of ferrosilicon.

The solvent was a 55% aqueous solution of potassium silicate.

2. Method of Application
   (1) Device for application: Spray gun of the type which is used for general coating purposes.
   (2) Quantity applied:

| Sample | A | B | C (Base) |
|---|---|---|---|
| Coated area | 550 mm × 350 mm | 550 mm × 350 mm | — |
| Quantity Powder (g) | 90 | 200 | 0 |
| Solvent (cc) | 150 | 330 | 0 |
| Coating thickness (mm) | 0.3 | 0.7 | 0 |

3. Heating Conditions
   Temperature 950° C.; time 150 hours
   The temperature was raised and lowered 4 times, and was in the range of about 500° C. to 950° C. for 24 hours. Samples A, B and C were placed horizontally in an electric furnace and heated under the conditions hereinabove stated.

4. Examination of Changes in Shape
   Each sample 2 was placed on a table, and the distance between a rule 1 and the sample 2 at each of the opposite ends b and mid-point a of the sample was measured. This was done along each of its width of 400 mm and its length of 600 mm both before the sample was heated and thereafter, in order to see if the sample had been deformed by heat.

5. Test Results

| Sample | Appearance | Change in Shape Width | Length |
|---|---|---|---|
| A | Unchanged | 1 mm | <0.5 mm |
| B | No peeling of the coating. Unchanged. | 1 mm | <1 mm |
| C (base) | Unchanged | <0.5 mm | <0.5 mm |

There was no deformation of the samples by heat, as is obvious from the table.

There was no softening or creeping of the refractory coating according to this invention or the ceramic fiber base even after they were heated rapidly with a certain load placed on the base. Various tests proved the effectiveness of the coating produced by the process of this invention. The refractory coating according to this invention withstands a maximum temperature of 1,700° C.

EXAMPLE 4 AND COMPARATIVE EXAMPLE 1

The following materials were thoroughly mixed to prepare 400 g of a powder mixture:

| Material | Weight (%) | Particle Size (mesh) |
|---|---|---|
| Silicon carbide (purity of 85%) | 19 | 325 |
| Graphite (C content of 97%) | 8 | 280 |
| Aluminum oxide (purity of 79%) | 20 | 300 |
| Silicon nitride (Si content of 55%) | 3 | 325 |
| Tricobalt tetroxide (purity of 95%) | 10 | 230 |
| Al—Co (Al content of 50%) | 22 | 220 |

| Material | Weight (%) | Particle Size (mesh) |
|---|---|---|
| Ferrosilicon (Si content of 89%) | 18 | 200 |

An aqueous solution of potassium silicate in the quantity of 590 g was prepared by dissolving 270 g of potassium silicate in 320 g of water. The powder mixture was added into the solution, and stirred thoroughly to prepare a uniform suspension. The suspension was applied in an amount of 800 g/m² by a brush to the inside walls (burner-flame portions) of a continuous heating furnace (Petroleum Ethylene Cracker) constructed of fire bricks (LBK28, High-Porous). The furnace was fired with LNG, and operated at a temperature of 1,100° C. to 1,200° C. for 12 months continuously, followed by cooling it at a room temperature (Sample A in Example 4).

For comparison, the following materials were thoroughly mixed.

| Material | Weight (%) | Particle Size (mesh) |
|---|---|---|
| Silicon carbide (SiC) | 40 | 285 |
| Zirconium oxide (ZrO₂) | 2 | 260 |
| Aluminum phosphate [Al(H₂PO₄), pH 3] | 50 | — |
| Water | 8 | — |

The resulting mixture solution was applied to the inside walls of the furnace and treated in the same procedure as in above Example 4 (Sample B in Comparative Example 1).

Sample A and Sample B were compared in the deformation of coatings and the surface blackness. The results are shown in photographs of FIGS. 3-(A) and 3-(B).

Figure 3A:
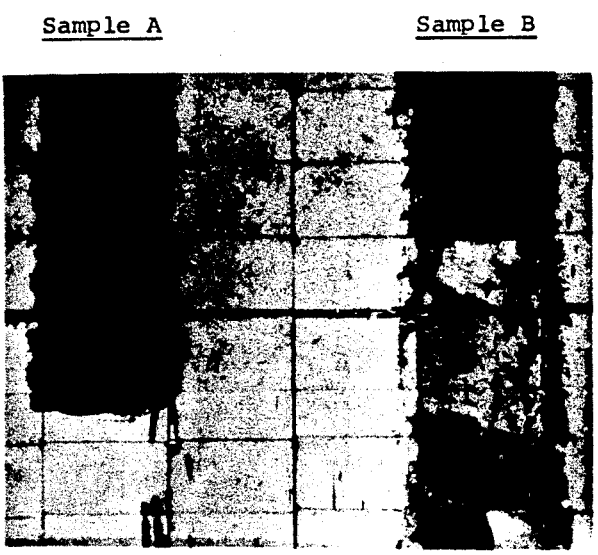
FIGS. 3-(A) and -(B) are photographs of the deformation of coatings in Example 4 and Comparative Example 1.
Figure 3B:
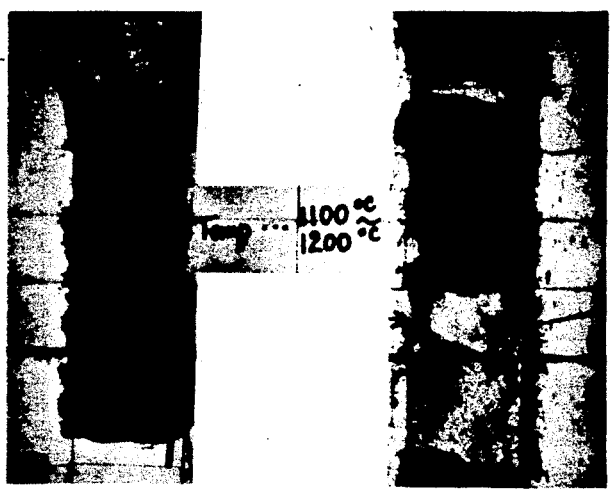

In Sample A of this invention, as shown in FIG. 3-(A), the blackened coating having a close structure and an adhesive strength was formed. The emissivity ($\epsilon$) of the coating in Sample A was measured by optical pyrometer. As the result, the emissivity value ($\epsilon$) of 0.95 was maintained. This value ($\epsilon$) was almost unchanged from the value at coating time.

On the other hand, in Sample B (comparison), it can be seen from FIG. 3-(A) that the internal deteriorations of the bricks as well as the cracking and peeling of the coating are caused at a high heating temperature by the oxidation reaction, the rapid changes of thermal expansion and the bursting of the refractory material base soaked with the phosphate. In view of the physical properties of SiC coating at a high temperature, the spalling of coatings can be considered to be deformations due to the difference between the volumetric expansion at a high temperature and the coefficient of linear expansion of Al(H₂PO₄), and the chemical reaction between the refractory bricks and the melted solution. Further, the emissivity ($\epsilon$) of the remaining coatings in Sample B was measured by optical pyrometer. As the result, it was as low as 0.71, resulting in the softening damages of SiC due to oxidation and the changes of from SiC into SiO₂.

Furthermore, the coatings formed on bricks in Samples A and B were partially removed and the surfaces of bricks from which the coating formed thereon was removed were observed as shown in the photograph of FIG. 3-(B). As shown in FIG. 3-(B), the deterioration of the brick's surface in Sample A was not observed, whereas the corrosion and deterioration of the surface of the bricks in Sample B was observed.

From the above-described results, it can be seen that the coating of this invention maintained a strong bond with the bricks, and high surface blackness.

While the invention has been described in detail and with reference to specific embodiments thereof, it will be apparent to one skilled in the art that various changes and modifications can be made therein without departing from the spirit and scope thereof.

What is claimed is:

1. A high emissivity refractory coating composition, comprising:
   a powder mixture comprised of 17 to 22% by weight of silicon carbide, 6 to 11% by weight of graphite, 17 to 22% by weight of aluminum oxide, 2 to 5% by weight of silicon nitride, 8 to 12% by weight of tricobalt tetroxide, 18 to 22% by weight of cobalt aluminum oxide and 18 to 23% by weight of ferrosilicon; and
   an aqueous solution of potassium silicate.

2. A refractory coating composition as claimed in claim 1, wherein the powder mixture and the aqueous solution of potassium silicate are present in a weight ratio in the range of 1:1 to 1:1.5.

3. A refractory coating composition as claimed in claim 1, wherein the aqueous solution of potassium silicate has a potassium silicate content of 50 to 60% by weight.

4. A high emissivity refractory coating comprising a cured coating composition composed of a powder mixture containing 17 to 22% by weight of silicon carbide, 6 to 11% by weight of graphite, 17 to 22% by weight of aluminum oxide, 2 to 5% by weight of silicon nitride, 8 to 12% by weight of tricobalt tetroxide, 18 to 22% by weight of cobalt aluminum oxide and 18 to 23% by weight of ferrosilicon, and an aqueous solution of potassium silicate.

5. A process for manufacturing a high emissivity refractory coating, comprising the steps of:
   mixing a powder mixture containing 17 to 22% by weight of silicon carbide, 6 to 11% by weight of graphite, 17 to 22% by weight of aluminum oxide, 2 to 5% by weight of silicon nitride, 8 to 12% by weight of tricobalt tetroxide, 18 to 22% by weight of cobalt aluminum oxide and 18 to 23% by weight of ferrosilicon, and an aqueous solution of potassium silicate to prepare a suspension;
   applying the suspension to the surface of a material in order to form a refractory coating thereon; and
   drying the coating for curing it.

6. A process for manufacturing a high emissivity refractory coating as claimed in claim 5, wherein the drying is carried out by heating the coating to a temperature in the range of 200° C. to 600° C.

7. A process for producing a high emissivity refractory coating as claimed in claim 5, wherein the weight ratio of the powder mixture to the aqueous solution of potassium silicate is within the range of 1:1 to 1:1.5.

8. A process for producing a high emissivity refractory coating as claimed in claim 5, wherein the aqueous solution of potassium silicate has a potassium silicate content of 50 to 60% by weight.

9. A process for producing a high emissivity refractory coating as claimed in claim 5, wherein the material to be coated with the suspension is furnace refractories or ceramic fibers.

* * * * *